(12) United States Patent
Grange et al.

(10) Patent No.: US 8,503,528 B2
(45) Date of Patent: Aug. 6, 2013

(54) SYSTEM AND METHOD FOR ENCODING VIDEO USING TEMPORAL FILTER

(75) Inventors: Adrian Grange, Cambridgeshire (GB); Paul Wilkins, Cambridge (GB); Francis William Galligan, Clifton Park, NY (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 12/882,299

(22) Filed: Sep. 15, 2010

(65) Prior Publication Data
US 2012/0063513 A1 Mar. 15, 2012

(51) Int. Cl.
*H04N 7/12* (2006.01)
*H04N 11/02* (2006.01)
*H04N 11/04* (2006.01)

(52) U.S. Cl.
USPC ............ 375/240.13; 375/240.24; 375/240.27

(58) Field of Classification Search
None
See application file for complete search history.

(56) References Cited

U.S. PATENT DOCUMENTS

| | | | |
|---|---|---|---|
| 5,568,200 A | 10/1996 | Pearlstein et al. | |
| 5,576,767 A | 11/1996 | Lee et al. | |
| 5,748,242 A * | 5/1998 | Podilchuk | 348/391.1 |
| 5,959,672 A * | 9/1999 | Sasaki | 375/240.23 |
| 6,097,842 A * | 8/2000 | Suzuki et al. | 382/232 |
| 6,904,096 B2 * | 6/2005 | Kobayashi et al. | 375/240.26 |
| 7,499,492 B1 | 3/2009 | Ameres et al. | |
| 7,590,179 B2 * | 9/2009 | Mukerjee | 375/240.15 |
| 7,606,310 B1 | 10/2009 | Ameres et al. | |
| 7,627,040 B2 * | 12/2009 | Woods et al. | 375/240.26 |
| 8,045,813 B2 | 10/2011 | Lee et al. | |
| 2002/0071485 A1 | 6/2002 | Caglar et al. | |
| 2002/0176502 A1 * | 11/2002 | Rose et al. | 375/240.13 |
| 2003/0039310 A1 | 2/2003 | Wu et al. | |
| 2003/0165331 A1 | 9/2003 | Van Der Schaar | |
| 2003/0215014 A1 | 11/2003 | Koto et al. | |
| 2004/0042549 A1 | 3/2004 | Huang et al. | |
| 2004/0080669 A1 | 4/2004 | Nagai et al. | |
| 2004/0184533 A1 | 9/2004 | Wang | |
| 2005/0286629 A1 | 12/2005 | Dumitras et al. | |
| 2006/0093038 A1 * | 5/2006 | Boyce | 375/240.16 |
| 2006/0098738 A1 | 5/2006 | Cosman et al. | |
| 2007/0081593 A1 * | 4/2007 | Jeong et al. | 375/240.19 |
| 2007/0098067 A1 * | 5/2007 | Kim et al. | 375/240.08 |
| 2007/0153899 A1 * | 7/2007 | Koto et al. | 375/240.16 |

(Continued)

OTHER PUBLICATIONS

"Series H: Audiovisual and Multimedia Systems; Infrastructure of audiovisual services- Coding of moving video; Advanced video coding for generic audiovisual services". H.264. Version 1. International Telecommunication Union. Dated May 2003.

(Continued)

*Primary Examiner* — Joseph Ustaris
*Assistant Examiner* — Ellyar Barazesh
(74) *Attorney, Agent, or Firm* — Young Basile Hanlon & MacFarlane P.C.

(57) ABSTRACT

A system and method for encoding a video is disclosed having a plurality of frames with spatially correspondent macroblocks. The method includes selecting a coding mode for each spatially correspondent macroblock, such as intra-frame coding or inter-frame coding. A weighting value is determined for each pixel in the macroblock based on the coding mode of the macroblock or other indication of the correlation of the pixel to spatially corresponding pixels in one or more other frames. A temporal filter uses the weighting values to filter noise from the plurality of frames and the resulting noise-reduced output is used in a predictive reference frame.

25 Claims, 7 Drawing Sheets

U.S. PATENT DOCUMENTS

| | | | |
|---|---|---|---|
| 2007/0274388 A1* | 11/2007 | Lee et al. ................ | 375/240.13 |
| 2008/0101469 A1 | 5/2008 | Ishtiaq et al. | |
| 2008/0130755 A1 | 6/2008 | Loukas et al. | |
| 2008/0198931 A1* | 8/2008 | Chappalli et al. ........ | 375/240.16 |
| 2008/0219351 A1 | 9/2008 | Kim et al. | |
| 2008/0279279 A1* | 11/2008 | Liu et al. ................ | 375/240.16 |
| 2009/0034617 A1* | 2/2009 | Tanaka ................... | 375/240.13 |
| 2011/0007799 A1* | 1/2011 | Karczewicz et al. ..... | 375/240.12 |
| 2011/0228843 A1 | 9/2011 | Narroschke et al. | |
| 2012/0063513 A1 | 3/2012 | Grange et al. | |

OTHER PUBLICATIONS

"Series H: Audiovisual and Multimedia Systems; Infrastructure of audiovisual services- Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services- Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services- Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services- Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services- Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services- Coding of moving video". H.264. Advanced video coding for generic audiovisual services. International Telecommunication Union. Version 12. Dated Mar. 2010.

"VP8 Data Format and Decoding Guide". WebM Project. Google ON2. Dated Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web" Dated Jul. 11, 2011.

Bankoski et al. "VP8 Data Format and Decoding Guide" Independent Submission. Dated Nov. 2011.

Zhi Liu, Zhaoyang Zhang, Liquan Shen, Mosaic Generation in H.264 Compressed Domain, IEEE 2006.

ON2 Technologies, Inc. White Paper TrueMotion VP7 Video Codec, Jan. 10, 2005, 13 pages, Document Version: 1.0, Clifton Park, New York.

ON2 Technologies, Inc. White Paper On2's TrueMotion VP7 Video Codec, Jul. 11, 2008, 7 pages, Document Version: 1.0, Clifton Park, New York.

Wu, Yaowu; "InsideWebM Technology: The VP8 Alternate Reference Frame"; http://blog.webmproject.org/2010/05/inside-webm-technol ogy-vp8-alternate.html dated May 27, 2010.

International Search Report for PCT/US2011/051287; dated Nov. 10, 2011.

* cited by examiner

SYSTEM AND METHOD FOR ENCODING VIDEO USING TEMPORAL FILTER

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google, Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use prediction techniques to minimize the amount of data required to transmit video information. Prediction techniques can allow for multiple past transmitted frames and future frames to be transmitted out of order and used as potential reference frame predictors for macroblocks in a frame. For example, video compression schemes, such as the MPEG or H.264 standard allow for transmission of frames out of order and use them to produce better predictors by use of forward or bidirectional prediction. Further, for example, the H.264 video compression standard allows for multiple past reference frames to be used as a predictor. More recently, some predication techniques synthesize predictive reference frames that are not necessarily displayed during the decoding process, such as shown, for example, by U.S. patent application Ser. No. 12/329,041 filed Dec. 5, 2008.

SUMMARY

Systems and methods for encoding a video signal are disclosed. In accordance with one aspect of the disclosed embodiments, a method is provided for encoding a video signal having a plurality of frames including macroblocks containing pixels. The method includes selecting a filter set from the plurality of frames; determining, for at least a first pixel in the filter set, a pixel-specific factor at least partially indicative of the correlation that the first pixel bears to a second spatially correspondent pixel in the filter set; and determining weighted averages of at least some pixels in the filter set, including the first pixel and second pixel, wherein the weight applied to the first pixel is derived from the pixel-specific factor. At least a portion of a predictive reference frame is generated using the weighted averages.

In another aspect of the disclosed embodiments, a method is provided for encoding a video signal having a plurality of frames with spatially correspondent portions. The method includes determining a plurality of factors for a first portion residing in a selected frame, and applying a temporal filter to at least the first portion and the second portion to generate output that has predictive value. The factors are at least partially indicative of the correlation between the first portion of the selected frame and at least a second portion residing in another one of the plurality of frames. The temporal filter uses filter weights that are derived from the factors.

In another aspect of the disclosed embodiments, a method is provided for encoding a video signal having a plurality of frames, including a reference frame. Each frame includes blocks having a plurality of pixels. The method includes selecting as a filter set a plurality of blocks including spatially correspondent blocks residing in a different ones of the plurality of frames; determining the temporal correlation of at least a first block in the filter set relative to at least one other block in the filter set; determining a block-specific factor for at least the first block based on its determined temporal correlation; and applying a temporal filter to a plurality of pixels in the filter set, including at least a first pixel in the first block. The temporal filter applies to the first pixel a weight that is derived at least partially from the block-specific factor.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
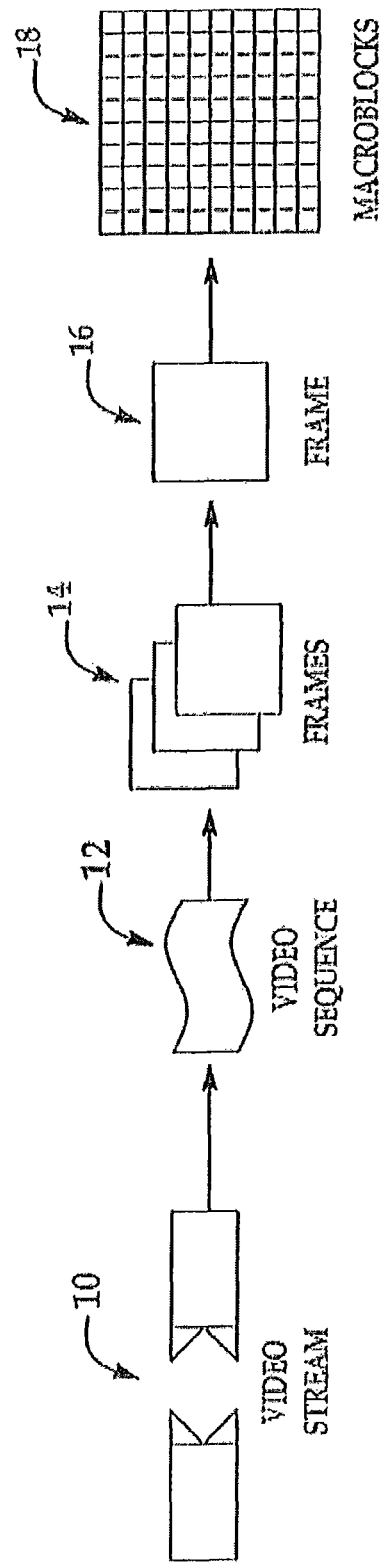
FIG. 1 is a diagram of a video bitstream.

FIG. 1 is a diagram a typical video bitstream 10 to be encoded and decoded. Video coding formats, such as VP8 or H.264, provide a defined hierarchy of layers for video stream 10. Video stream includes a video sequence 12. At the next level, video sequence 12 consists of a number of adjacent frames 14, which can be further subdivided into a single frame 16. At the next level, frame 16 can be composed of a series of macroblocks 18, which contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups.

Figure 2:
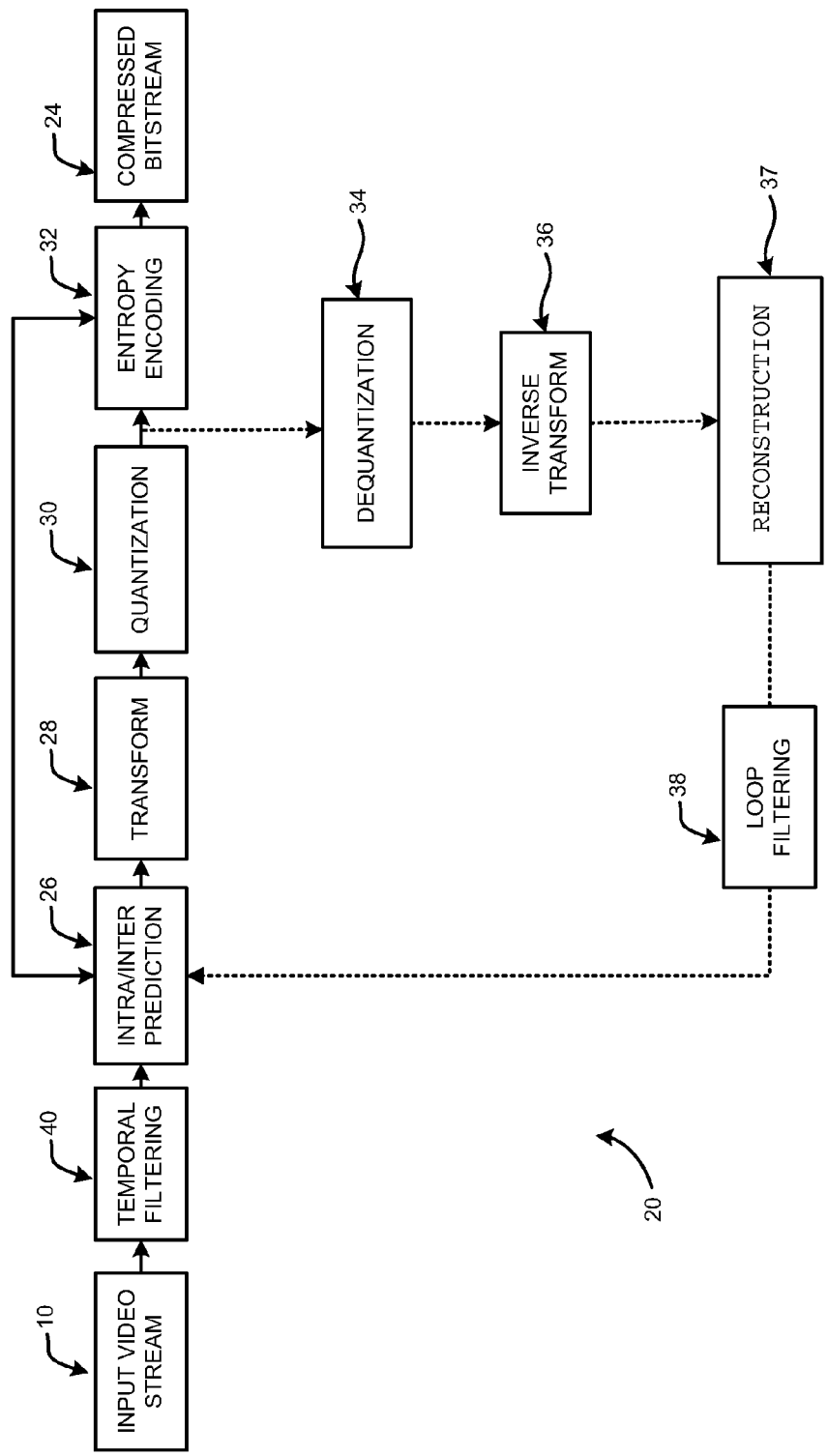
FIG. 2 is a block diagram of a video compression system in accordance with one embodiment.

FIG. 2 is a block diagram of a video compression system in accordance with one embodiment. An encoder 20 encodes as input video stream 10. Encoder 20 has stages to perform the various functions in a forward path (shown by the solid connection lines) to produce an encoded or compressed bitstream 24: temporal filter stage 40, intra/inter prediction stage 26, transform stage 28, quantization stage 30 and entropy encoding stage 32. Encoder 20 also includes a reconstruction path (shown by the dotted connection lines) to reconstruct a frame for encoding of further macroblocks. Encoder 20 has stages to perform the various functions in the reconstruction path:

dequantization stage 34, inverse transform stage 36, reconstruction stage 37 and loop filtering stage 38. Other structural variations of encoder 20 can be used to encode bitstream 24.

Encoder 20 includes a temporal filter 40, which as shown in FIG. 2 can be included with the intra/inter prediction stage 26. In this case temporal filter 40 can be designed to filter noise from a set of frames so that the output of the filter can be used to synthesize a reference or alternative predictor frame. The implementation of temporal filter 40 is discussed below. The parameters of temporal filter can be adjusted to create a reduced-noise frame for use as a predictor during the encoding process. For example, the filter length, weightings and strength can be adjusted. This adjustment process can permit the filtering to take into account contextual information (such as, for example, coding modes) and other input to establish the degree of correlation between adjacent frames to filter noise from a common underlying signal. The process can be applied at the full-frame, macro-block or any other segmentation of the frame where the degree of spatial correlation between frames can be established.

When input video stream 10 is presented for encoding, each frame 16 within input video stream 22 is processed in units of macroblocks. At intra/inter prediction stage 26, each macroblock can be encoded using either intra prediction or inter prediction mode. In either case, a prediction macroblock can be formed based on a reconstructed frame. In the case of intra-prediction, a prediction macroblock can be formed from samples in the current frame that have been previously encoded and reconstructed. In the case of inter-prediction, a prediction macroblock can be formed from one or more constructed reference frames as described in additional detail herein.

Next, still referring to FIG. 2, the prediction macroblock can be subtracted from the current macroblock at stage 26 to produce a residual macroblock (residual). Transform stage 28 transform codes the residual, and quantization stage 30 quantizes the residual to provide a set of quantized transform coefficients. The quantized transform coefficients are then entropy coded by entropy encoding stage 32. The entropy-coded coefficients, together with the information required to decode the macroblock, such as the type of prediction mode used, motion vectors and quantizer value, are output to compressed bitstream 24.

The reconstruction path in FIG. 2 is present to ensure that both the encoder and the decoder use the same reference frames required to decode the macroblocks. The reconstruction path, similar to functions that take place during the decoding process that are discussed in more detail below, includes dequantizing the transformed coefficients by dequantization stage 34 and inverse transforming the coefficients by inverse transform stage 36 to produce a derivative residual macroblock (derivative residual). At reconstruction stage 37, the prediction macroblock can be added to the derivative residual to create a reconstructed macroblock. A loop filter 38 can be applied to the reconstructed macroblock to reduce blocking distortion. The output of loop filter 38 is passed to intra/inter prediction stage 40 so that the reconstructed block can be used to determine the residual for the current block.

The encoding process shown in FIG. 2 can include two iterations or "passes" of processing the video data. The first pass can be carried out by encoder 20 using an encoding process that is less computationally intensive, and that gathers and stores information about input video stream 10 for use in the second pass. In the second pass, encoder 20 uses this information to optimize final encoding of compressed bitstream 24. For example, encoder 20 may use this information to select parameters for encoding, locating key-frames and selecting coding modes used to encode macroblocks 18, and allocating the number of bits to each frame. The output of the second pass can be final compressed bitstream 24.

Figure 3:
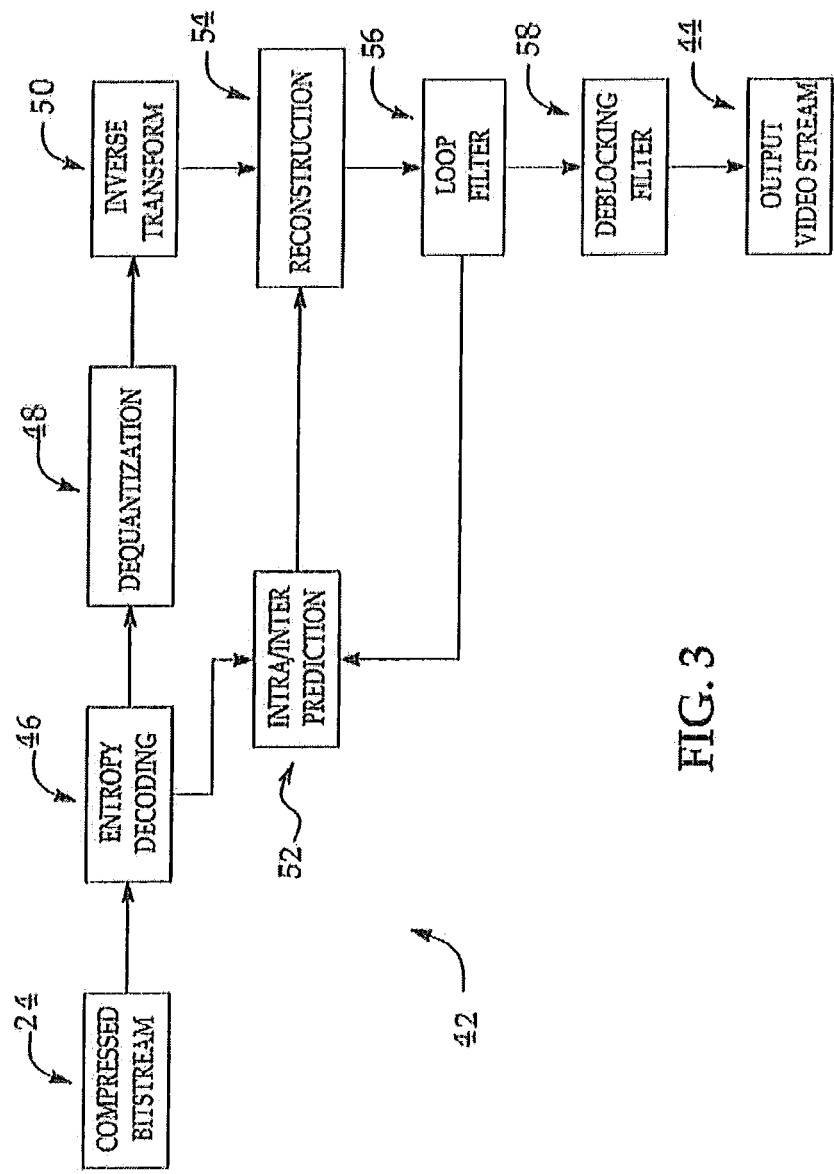
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, has stages to perform various functions to produce an output video stream 44: entropy decoding stage 46, dequantization stage 48, inverse transform stage 50, intra/inter prediction stage 52, reconstruction stage 54, loop filter stage 56 and deblocking filtering stage 58. Other structural variations of decoder 42 can be used to decode compressed bitstream 24.

When compressed bitstream 24 is presented for decoding, the data elements can be entropy decoded by entropy decoding stage 46 (using for, for example, Context Adaptive Binary Arithmetic Coding) to produce a set of quantized coefficients. Dequantization stage 48 dequantizes the coefficients, and inverse transform stage 50 inverse transforms the coefficients to produce a derivative residual that can be identical to that created by the reconstruction stage in the encoder 20. Using header information decoded from the compressed bitstream 24, at intra/inter prediction stage 52, decoder 42 creates the same prediction macroblock as was created in encoder 20. At the reconstruction stage 54, the prediction macroblock can be added to the derivative residual to create a reconstructed macroblock. The loop filter 56 can be applied to the reconstructed macroblock to further reduce blocking artifacts. Deblocking filter 58 can be applied to the reconstructed macroblock to reduce blocking distortion, and the result is output as output video stream 44.

Referring again to encoder 20, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames.

Video encoders may use motion compensation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of a residual. The encoder 20 may thus encode a frame as data that comprises one or more of the motion vectors and residuals for a particular partitioning of the frame. A particular partition of blocks for encoding the frame may be selected by approximately minimizing a cost function that, for example, balances encoding size with distortion to the content of the frame resulting from encoding.

As described briefly above, many video coding algorithms first partition each picture into macroblocks. Then, each macroblock can be coded using some form of predictive coding method. Some video coding standards use different types of predicted macroblocks in their coding. In one scenario, a macroblock may be one of three types: 1) Intra (I) macroblock that uses no information from other pictures in its coding; 2) Unidirectionally Predicted (P) macroblock that uses information from one preceding picture; and 3) Bidirectionally Predicted (B) macroblock that uses information from one preceding picture and one future picture.

Figure 4:
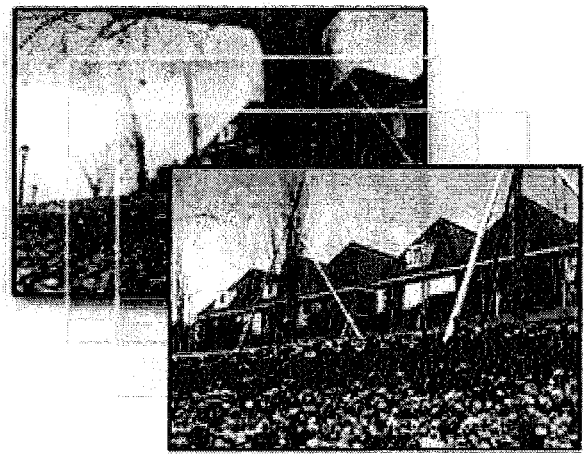
FIG. 4 is a pictorial representation of a constructed reference frame created using the video compression system shown in FIG. 2.
Figure 4:
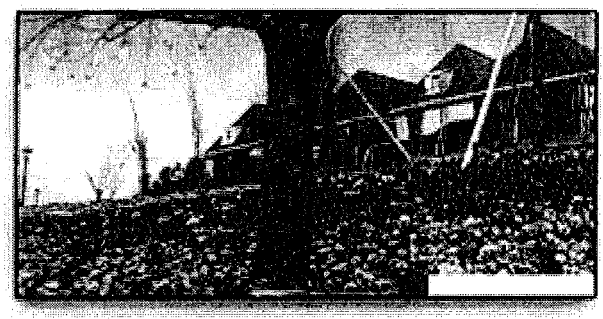

To facilitate higher quality compressed video, it is helpful to have the best matching reference frame in order to have the smallest difference to encode, which generally results in a more compact encoding. Reference frames are based on past frames, future frames, or an intra-frame so that the encoder can find the best matching block to use in the predictive process as shown in, for example, U.S. Application Publication No. 2005/0286629. Reference frames can also be based on synthesized or constructed frames that are not shown to the end user after decoding, as shown in, for example, in co-pending U.S. Pat. App. Publication No. 2010/0061461 A1, filed Dec. 5, 2008 and hereby incorporated by reference in its entirety. FIG. 4 is a pictorial representation of a constructed reference frame. Such constructed reference frames are referred to herein as "alternative reference frames."

The method of constructing a reference frame can include selecting the target frame and using temporal filter 40 (FIG. 2) to remove video noise from several source frames centered on that target frame. Noise filtering can be applied by the encoder by using, for example, a motion-compensated threshold blur filter such as described in U.S. Pat. No. 6,178,205, which is incorporated herein in its entirety by reference or other appropriate filter such as an averaging process. Removal of the video noise that differs from frame to frame makes the constructed reference frame a better predictor for multiple frames, increasing data compression of the video stream.

In this case, temporal filter 40 is associated with at least two parameters, length L and strength S. These parameters are discussed below in more detail, but in general the length L refers to the number of frames that are being filtered (the "filter set") and strength S refers to the strength of the filter—that is, its power to suppress noise. The value of strength S can be fixed for the entire filter set or can be adjusted locally based on the amount of noise in a video signal. As discussed below, the temporal filter 40 can also adjust the weightings W applied to individual macroblocks and pixels to improve filter performance when the underlying signal is non-stationary or includes discontinuities.

Figure 5:
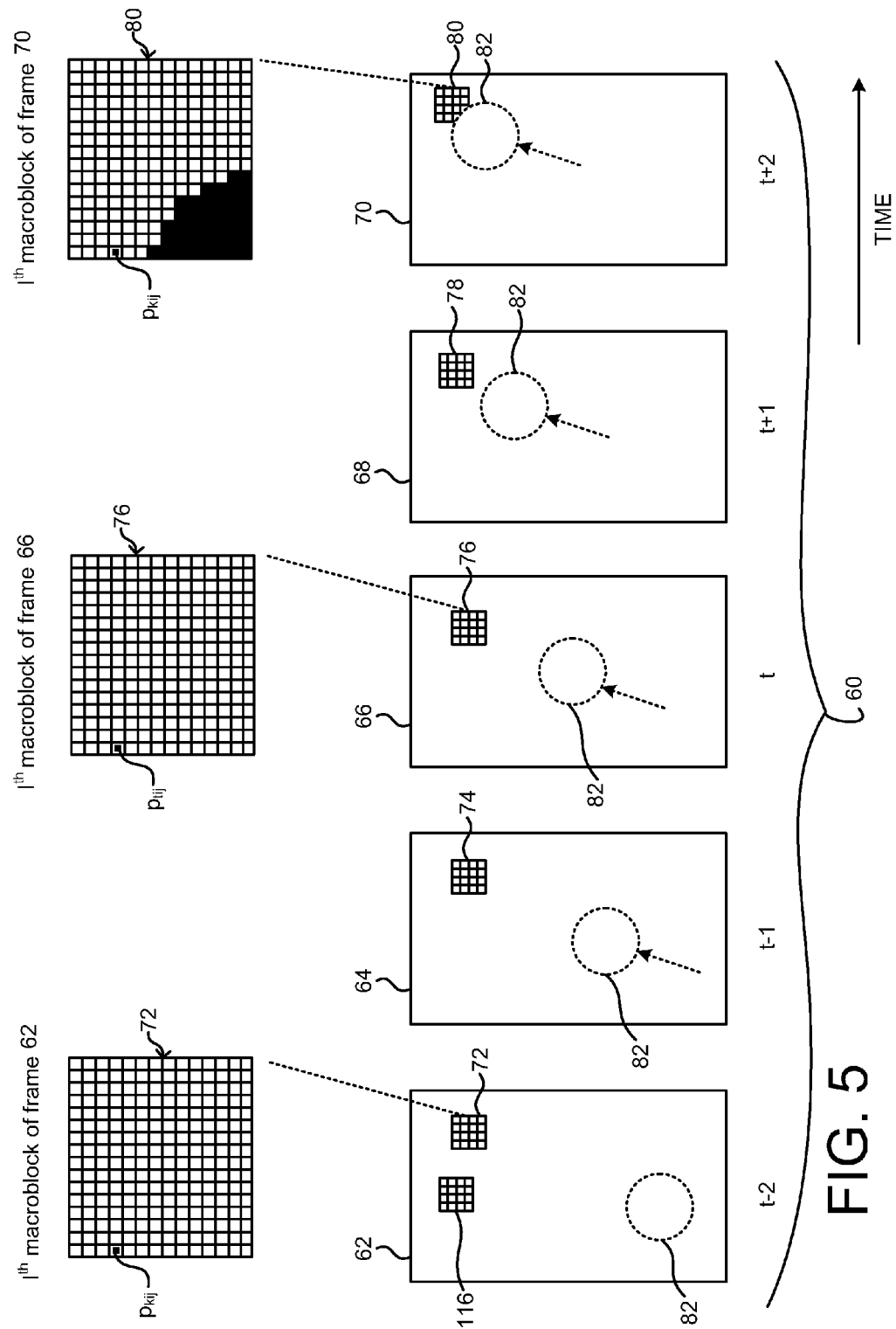
FIG. 5 is a schematic diagram illustrating a set of frames to be filtered using the temporal filter shown in FIG. 2.

The operation of temporal filter 40 is now explained in more detail. FIG. 5 is a schematic diagram illustrating a set of frames 60 to be filtered that are centrally temporally disposed around reference frame 66. Reference frame 66 occurs at time t and is followed by frames 68 and 70, occurring at times t+1 and t+2, respectively. Reference frame 66 is preceded in time by frames 62 and 64, occurring at times t−2 and t−1, respectively. In this case the filter length is 5. Other filter lengths may be used. Using temporal filter 40, encoder 20 can reduce random noise fluctuations in pixel values occurring over the filter set.

Each of frames 62-70 includes macroblocks such as macroblocks 72-80, which are located at the same corresponding spatial position in each frame. Macroblocks 72-80 are comprised of pixels including pixels located at the same corresponding spatial positions in each frame. Pixels are referred to herein as $p_{k,i,j}$, where k designates the frame (that is, one of frames 62-70 occurring at times t−2 through t+2), i designates the macroblock within each frame, and j designates the pixel position within each macroblock. For example, referring to FIG. 5, pixels $p_{k,i,j}$ in corresponding positions are shown in macroblocks 72, 76 and 80. Note that in macroblock 76, the subscript k is replaced with the value t for purposes of illustration because macroblock 76 resides in reference frame 66 which occurs at time t. The subscript for the pixel in macroblock 72 could also have been expressed as $p_{(t-2),i,j}$, for example. The spatial correspondence referred herein means the pixel, macroblock or other partition has the same or corresponding position from one frame to another. Also, as explained below, motion vectors can be taken into account when determining what constitutes spatial correspondence.

Temporal filtering for noise reduction can in some cases operate on the principle that the zero-mean noise can be removed from the static signal observed over a set of consecutive frames by some form of averaging process. Other types of noise can also be removed. Such schemes provide effective filtering performance when the captured scene or portion thereof is stationary. However, filter sets can include non-stationary content. For example, the scene may include motion or a change in content (at a scene change for example). In these non-stationary filter sets, then the premise of a stationary signal is broken and the filter output can be distorted. For example, as an object 82 (FIG. 5) moves quickly through the scenes of frames 62-70, the pixel values in macroblock 80 are different (indicated by black boxes) relative to the spatially corresponding pixels of macroblocks 72 and 76, for example. The variance in the underlying signal caused by this motion adversely affects conventional filtering schemes, which may attenuate the underlying signal attributable to the movement or may produce distortions in their output based on the signal attributable to the movement.

One application for filtering as described herein is in the creation of an alternative reference frame, although other types of reference frames or other frames having predictive value can be created. In this case, the temporal filtering process can synthesize a single alternative reference frame from a filter set of frames occurring at different time periods by a process of temporal filtering of input video. The synthesized alternative reference frame can be encoded and inserted in the output bitstream. For example, having encoded frames at t−10 and t−9 (not shown in FIG. 5), the encoder logic may encode an alternative reference frame synthesized from the frames surrounding frame 66 (at time t). If the maximum filter length is 5, then two frames on either side of reference frame 66 can be included in the filtered set (that is, frames 62, 64 and 68, 70). At each spatial pixel location, an output value is created as a weighted average of the five spatially correspondent pixel locations in frames 62-70. The filter weights for each pixel can be computed during the second pass of the encode process described below based on information gathered during the first pass of the encode process. This information can include encoding modes of the macroblocks in which the pixels reside. Alternatively, other contextual information can be used to determine the correlation between frames. The filter can be applied to every frame or can be applied to only those frames for which information (gathered during the first pass) indicates a high level of inter-frame correlation.

In the disclosed embodiments, parameters of temporal filter 40 (FIG. 2) such as filter length, filter strength and filter weights, are adjusted based on the temporal correlation of the underlying signal. For example, the parameters of filter 40 can be adjusted based on the results of the first pass of encoder 20 to account for the correlation of data in the filter set 60 and in some cases motion between frames 62-70. Macroblock coding modes can be determined during the first pass and this information can be used during the second pass as an indication of temporal correlation between frames. Parameters that can be adjusted based on this information include adjustment of filter length, filter weights and filter strength applied to each pixel. By adjusting these parameters, noise can thus be more effectively filtered in frames with motion between frames or other discontinuities. Filter 40 can operate on a full-frame, macro-block or any other segmentation of the frame where the degree of spatial correlation between frames can be established.

In the illustrated embodiment, the filter parameters that are adjusted are filter length L and the filter weight W applied to each pixel. Filter length L can be based on the number of adjacent frames that are well correlated. In the illustrated embodiment, filter length is 5. However, a different filter length can be used, such as 11. Filter length can be effectively adjusted in the disclosed embodiment by setting filter weightings to zero as described below.

The filter weighting value or weight applied to each pixel can be adjusted for example, to more heavily weight those pixel values with a higher level of temporal correlation. In the illustrated embodiment, the filter weight applied to the $j^{th}$ pixel of the $i^{th}$ macroblock of the $k^{th}$ frame is as follows:

$$W_{k,i,j} = M_{k,i} \times P_{k,i,j}$$

Other suitable formulas can be used such as formulas that include a component indicative of temporal correlation between the frames. The values of $M_{k,i}$ and $P_{k,i,j}$ are referred to herein as factors in the calculation of weight $W_{k,i,j}$ but the term "factor" is used in the specification and accompanying claims synonymously with value or input, and is not limited to the mathematical definition of expressions that are multiplied together to get a product.

In the foregoing formulate, the value $M_{k,i}$ is a weighting component applied to an overall macroblock within the $k^{th}$ frame. In this sense, $M_{k,i}$ is a macroblock-specific factor or value, although the value for $M_{k,i}$ can (depending on the data) be the same across a number of macroblocks. Also, the value of $M_{k,i}$ can in some embodiments be applied to any arbitrary block of pixels, and the terminology "macroblock-specific" is not limited to values of $M_{k,i}$ only for blocks that are considered "macroblocks" but rather can be applied to pixel regions of any shape and size. Generally speaking, values of $M_{k,i}$ can be determined with reference to the coding mode of the macroblock. The coding mode is an indication of the temporal correlation that the macroblock has with its spatially correspondent macroblocks in reference frame 66 or frames nearer to reference frame 66. When the macroblock is associated with intra-frame coding, it can be concluded that temporal correlation has been broken, such as might occur when there is movement in the scene. The value of $M_{k,i}$ for the macroblock can be set to zero in that case. When the macroblock is associated with 0,0 inter-frame coding, it can be concluded that a high level of temporal correlation exists. The value of $M_{k,i}$ can be set to a higher level. When the macroblock is associated with inter-frame coding and some motion vector, it can be concluded that correlation may exist, and the value of $M_{k,i}$ can be set to an intermediate level. Techniques for setting $M_{k,i}$ in the disclosed embodiment are described below.

The value $P_{k,i,j}$ is a weighting component applied to a specific pixel $p_{k,i,j}$. In this sense, $P_{k,i,j}$ is a pixel-specific factor or value. However, it should be understood that $P_{k,i,j}$ can in some embodiments be calculated for groups as pixels as well (e.g., 2-4 pixels), and so the terminology "pixel-specific" is not limited to individual pixels. Also, depending on the data, a number of pixels can have equal values of $P_{k,i,j}$.

Figure 6:
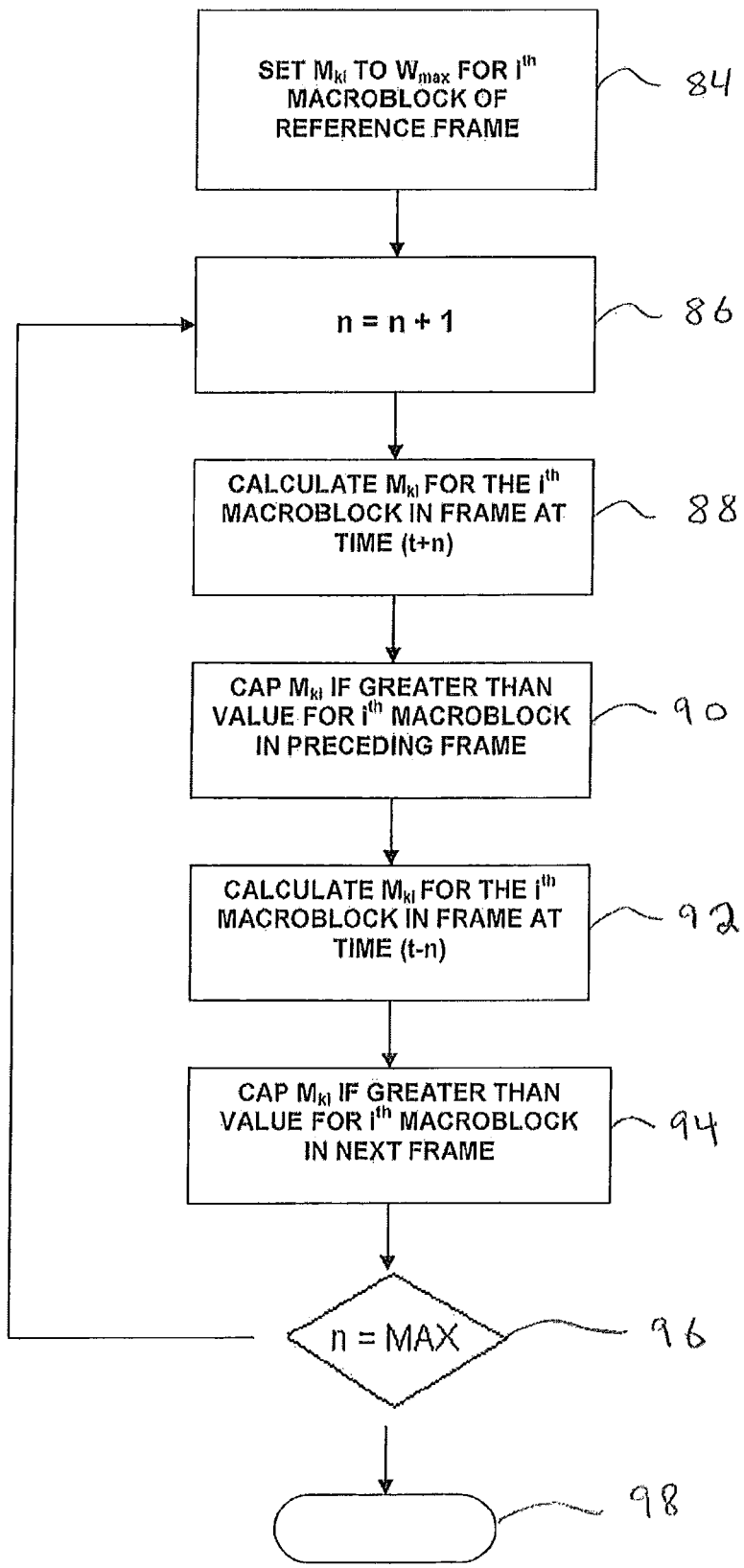
FIG. 6 is a flow chart illustrating an exemplary method of determining weightings for use by the temporal filter shown in FIG. 2.
Figure 7:
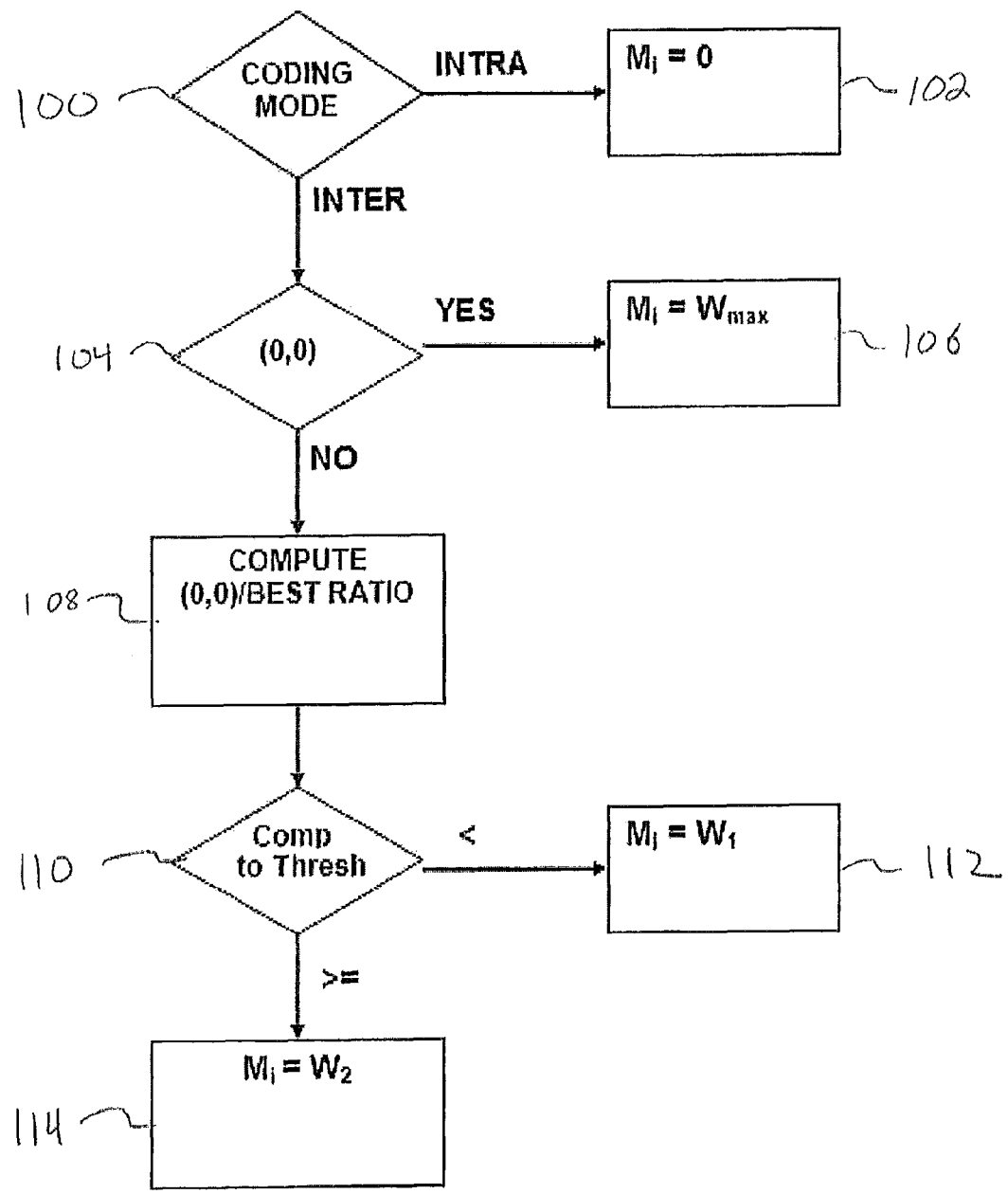
FIG. 7 is a flow chart illustrating an exemplary method of determining weightings for use by the temporal filter shown in FIG. 2.

The computation of $M_{k,i}$ is now explained with reference to FIGS. 6 and 7. Referring to FIG. 6, a logic flow chart presents one suitable technique for determining the values of $M_{k,i}$ for spatially corresponding macroblocks 72-80 in each frame of the filter set 60 (FIG. 5). FIG. 6 illustrates a capping process by which values $M_{k,i}$ of macroblocks in adjacent frames can be capped. FIG. 7 illustrates the underlying process for determining the underlying values of $M_{k,i}$ before this capping process. As explained above, the values of $M_{k,i}$ can be determined with reference to the coding mode of the subject macroblock, where the coding mode is an indication of the correlation of that block with other blocks.

With reference to FIG. 6, it is assumed for purposes of illustration that the length L of filter set 60 is 5. Other filter lengths can be used. Beginning at step 84, the value of $M_{k,i}$ for the $i^{th}$ macroblock 76 of the reference frame 66 (occurring at time t) is set to a maximum weight $W_{max}$. Control then moves to step 86, where a counter n (initialized at zero) is incremented by one. Control then moves to step 88, where the weight $M_{k,i}$ is calculated for the $i^{th}$ macroblock of the $k^{th}$ frame occurring at time t+n. A specific example of the computation of $M_{k,i}$ is provided below.

Thus, in the first iteration of the process at step 88 (n=1), the value of $M_{k,i}$ would be calculated for the $i^{th}$ macroblock 78 of frame 68 occurring at time t+1 (FIG. 5). Control then moves to step 90, where a determination is made as to whether the value $M_{k,i}$ calculated at step 88 (k=t+n) is greater than the value $M_{k,i}$ calculated for the $i^{th}$ macroblock in the preceding frame (k=t+n−1). If so, at step 90 the value of $M_{k,i}$ as calculated at step 88 is capped at the value of $M_{k,i}$ for the $i^{th}$ macroblock in the preceding frame (k=t+n−1) For example, during the first iteration of step 90, the value for the $M_{(t+1),i}$ for the $i^{th}$ macroblock 78 in frame 68 occurring at time t+1 (thus, k=t+1) would be capped at the value of $M_{t,i}$ for the $i^{th}$ macroblock 76 in frame 66 occurring at time t (thus, k=t).

Control then moves to step 92, where the weight $M_{k,i}$ is calculated for the $i^{th}$ macroblock of the frame occurring at time t−n. A specific example of the computation of $M_{k,i}$ is provided below. Thus, in the first iteration of the process at step 92, the value of $M_{k,i}$ would be calculated for the macroblock 74 of frame 64 occurring at time t−1 (FIG. 5). Control then moves to step 94, where a determination is made as to whether the value $M_{k,i}$ calculated at step 92 (k=t−n) is greater than the value $M_{k,i}$ calculated for the $i^{th}$ macroblock in the following frame (k=t−n+1). If so, at step 94 the value of $M_{k,i}$ as calculated at step 92 is capped at the value of $M_{k,i}$ for the $i^{th}$ macroblock in the following frame (k=t−n+1). For example, during the first iteration of step 94, the value for the $M_{(t-1),i}$ for the $i^{th}$ macroblock 74 in frame 64 occurring at time t−1 (thus, k=t−1) would capped at the value of $M_{t,i}$ for the $i^{th}$ macroblock 76 in frame 66 occurring at time t (thus k=t). Note that if the reference frame macroblocks are always set to a maximum weighting, then the capping steps 90 and 94 can be skipped for the first iteration (that is, for the $i^{th}$ macroblocks of the frames immediately adjacent to the reference frame)

Capping the values of $M_{k,i}$ in this manner reduces the weighting for pixels following likely decreases in temporal correlation. Capping also has the effect of adjusting the effective size of length L, because when a macroblock in a frame is assigned a weight of 0, macroblocks in more remote frames (relative to the central reference frame) will be capped at 0 as well. For example, if macroblock 78 in frame 68 at time t+1 has an $M_{k,i}$ value of 0, then macroblock 80 in subsequent frame 70 (and other subsequent frames as well if length L were greater than 5) will also have a weight of 0. In effect, the filter length L is reduced by 2, because the $M_{k,i}$ values for macroblocks 78 and 80 in two of the frames (68 and 70) are set to zero, meaning that the weights applies to those macroblocks 78 and 80 will be set to zero and therefore the pixel values in macroblocks 78 and 80 will not be included in the filter calculations. The filter length is in effect truncated starting at the first macroblock with a zero $M_{k,i}$ value.

Thus, the effective length size L can be adjusted for different macroblocks such as macroblocks 72-80 based on the prediction mode of the macroblocks, for example. The adjustment can also be asymmetrical, in that the length for frames occurring after the reference frame (that is, at times t+n) can be adjusted differently from the length for frames occurring before the reference frame (that is, at time t−n). For example, in the disclosed embodiment, filter length L is 5, so that reference frame 66 and two frames before (i.e., frames 62 and 64) and two frames after (i.e. frames 68 and 70) reference frame 66) are included in filter set 60. As illustrated in the preceding paragraph, a discontinuity in a frame occurring after the reference frame can have the effect of truncating the length L of the filter set going forward. However, this does not necessarily affect the size of filter set 60 with respect to frames occurring before reference frame 66.

A mechanism for achieving this result is the capping described above with respect to FIG. 6. Other suitable techniques can be used. The effect of capping is to propagate the zero weighting outward in frames more remote from the reference frame than the frame in which the discontinuity occurred. Although the example above described a situation where a macroblock was assigned a zero value of $M_{k,i}$ this capping function can have a similar effect when a macroblock is assigned an intermediate value of $M_{k,i}$ such as when the coding mode is indicative of partial correlation (i.e. inter-frame coding other than 0,0). This decrease in correlation might be caused for example by motion such as motion occurring in frame 68. With capping, macroblocks in frames subsequent to frame 68 (i.e. more remote from reference frame 66) have a reduced value of $M_{k,i}$ (i.e., capped at the value of $M_{k,i}$ for macroblock 78), reflecting the partial break in correlation that occurred in frame 68.

Control then moves to step 96, where the counter n is compared to the value MAX. MAX is set to L/2 if L is even, (L−1)/2 if L is odd. If counter n equals MAX, then the operation terminates at step 98. Otherwise, control returns to step 86, where counter n is incremented and the process continues as described above. If an even filter length is used, the process described in FIG. 6 can be applied by filtering L/2 frames before the central reference frame, and L/2−1 frames after the central reference frame. In practice any arrangement of frames around the reference frame is possible.

Note that if the central reference frame is at or near the beginning or end of a video stream, the process described in FIG. 6 can be modified to shift the filter set forward or rearward relative to the central reference frame. For example, if the central reference frame were the first frame in the video stream, the filter set can include the L frames following that reference frame.

Referring to FIG. 7, an exemplary process is illustrated for calculating the value of $M_{k,i}$ as referenced in steps 88 and 92 of FIG. 6. At step 100, a determination is made as to whether the $i^{th}$ macroblock is associated with intra-frame coding or inter-frame coding based on the information gathered during the first pass by encoder 20. The determination of whether the $i^{th}$ macroblock is associated with intra-frame coding or inter-frame coding can optionally be made differently depending on whether the $i^{th}$ macroblock resides in a frame occurring before or after the central reference frame 66. If the $i^{th}$ macroblock resides in a frame occurring after the central reference frame 66 (such as, for example, frame 68), the determination is simply based on the coding mode used for the $i^{th}$ macroblock itself. If the $i^{th}$ macroblock resides in a frame occurring before the central reference frame 66 (such as, for example, frame 64), then the determination can be based on the coding mode for the spatially correspondent $i^{th}$ macroblock in the adjacent future frame. In the discussion below with respect to the process of FIG. 7, references to the coding mode associated with the $i^{th}$ macroblock are understood to be determined thusly.

If the macroblock is associated with an intra-coding mode, then control moves to step 102, where the value of $M_{k,i}$ is set to zero. The value of $M_{k,i}$ is set to zero in this case because the fact that the $i^{th}$ macroblock is associated with intra-frame coding likely indicates a low temporal correlation with correspondent macroblocks in adjacent frames. This can be the case, for example, if the scene changes or there is some other discontinuity in the underlying video signal.

If a determination is made at step 100 that the $i^{th}$ macroblock is associated with inter-frame coding, then control moves to step 104, where a determination is made as to whether the inter-frame coding was performed using the 0, 0 mode—that is, using the correspondingly spatially correspondent macroblock in a previous frame. If so, then control moves to step 106, where the value of $M_{k,i}$ is set to $W_{max}$. In this case, $W_{max}$ is a maximum value relative to the other weights assigned. The higher value is selected in some cases because the use of 0, 0 mode inter-frame coding can be indicative of a high correlation of the signal between frames. Alternatively, an additional test can be applied at step 104 in which the prediction error score for the 0,0 inter-frame coding mode can be compared to a defined threshold. If the prediction error exceeds the threshold, then $M_{k,i}$ is set to 0 or some other value less than $W_{max}$ because, even though 0,0 inter-frame coding mode was used during the first pass, there is low correlation If a determination is made at step 104 that the inter-frame coding mode is not 0,0, then control moves to step 108. At step 108, the prediction error score is determined for the macroblock using the 0,0 inter-frame coding mode. This number is divided by the error score achieved during the first pass using the inter-frame coding mode that resulted in the lowest prediction error score (sometimes referred to herein as the "Best" predictor). The prediction error score can be determined by encoder 20 during the first pass, in which one or more encoding modes are computed and the resulting prediction error is determined. For example, an error score can be based on the sum squared error between pixel values and predicted pixel values. The mode corresponding to the lowest prediction error score can be considered to be the best predictor.

Control then moves to step 110. At step 110, the quotient (or "(0,0)/ Best ratio") resulting from the dividing operation of step 108 is compared to a threshold value. The threshold value can be determined empirically depending on specific implementations but in this case is set to 1.1. If the quotient is below the threshold, then control moves to step 112, and the value of $M_{k,i}$ is set to a mid-range value $W_1$. If it is at or above the threshold, then control moves to block 114, where the value of $M_{k,i}$ is set to a lower value $W_2$. The values $W_{max} >= W_1 >= W_2 >= 0$ can be determined empirically and can vary depending upon the specific implementation of the encoder. In the disclosed embodiment, $W_{max}=2$, $W_1=1$ and $W_2=0$. The mid-range value $W_1$ and lower value $W_2$ are selected in some cases because an intercoded macroblock with a small motion vector may still have a correlation with the correspondingly spatially disposed macroblock in another frame if the computed (0,0)/Best ratio is close to 1. In place of discrete values, $W_{max} >= W_1 >= W_1 >= 0$, ranges can be used. In some cases, the ranges do not completely overlap. For example, $W_1$ could be a value taken from range such as 2 through 3 and $W_2$ can be a value taken from a range such as 1 through 2.

It will be appreciated that the process described in FIG. 7 has the result of determining whether the temporal correlation associated with the macroblock under consideration falls below a threshold, and this test can be applied differently depending on how the macroblock is coded. For example, if the macroblock is intra-frame encoded, the determination is always made that the temporal correlation falls below the threshold. If the macroblock is inter-frame encoded, then (as explained above), computations are performed to determine if the temporal correlation falls below a threshold. In the example above, these calculations use prediction error scores, but other suitable techniques can be employed.

The computation of $P_{k,i,j}$ is now explained. The value of $P_{k,i,j}$ is a weight computed separately for each $j^{th}$ pixel within the $i^{th}$ macroblock in each frame k. Pixels can be indexed in the macroblock in any order, but solely for purposes of illustration it is assumed that as j increases from 0, pixels in the macroblock are traversed in raster order. For example, filter set 60 includes frame 62 occurring at time t−2 (thus, k=t−2), which has an $i^{th}$ macroblock 72. Within the $i^{th}$ macroblock 72 is a pixel, $p_{k,i,j}$ where the subscript k designates the frame (in this case frame 62 occurring at time t−2) and the subscript j indicates the position of the pixel within the $i^{th}$ macroblock 72. Each of the other frames 64-70 includes $i^{th}$ macroblocks (namely, macroblocks 74-80) that are spatially correspondent with macroblock 72 of frame 62. Likewise, each of the spatially correspondent macroblocks 74-80 include pixels that are spatially correspondent to pixel $p_{k,i,j}$, of macroblock 72. For example, reference frame 66 includes a pixel $p_{t,i,j}$ (k=t) and frame 70 includes a pixel $p_{k,i,j}$ (k=t+2) that are both spatially correspondent to the pixel $p_{k,i,j}$ of macroblock 72.

A weight $P_{k,i,j}$ is computed for each pixel in the frame based on the difference between its value and the value of the spatially corresponding pixel in the central reference frame 76, which is designated as pixel $p_{t,i,j}$ in FIG. 5. One suitable formula for determining the $P_{k,i,j}$ value is as follows:

$$P_{k,i,j}=a-CAP(b*(p_{k,i,j}-p_{t,i,j})^2/n^S),$$

where a and b are empirically derived constants (in this case, a=16 and b=3), n is an integer (in this case 2), S equals filter strength and the function CAP clips the value within parentheses to a maximum value of a. In the foregoing formula, the $j^{th}$ pixel in reference frame 66 (occurring at time t) is $p_{t,i,j}$, and the pixels at the corresponding spatial position in the other frames from filter set 60 are $p_{k,i,j}$, with k=(t−2, t−1, t+1, t+2). Thus, weight $P_{k,i,j}$ is a measure of the temporal correlation between values of spatially correspondent pixel values in reference frame 66 and earlier or later frames 62-64 and 68-70, respectively. Note that the constants used in this formula can vary depending on the implementation in which this embodiment is practiced.

Filter strength S in this case is set between 0 and 6, but other suitable values can be empirically determined for specific implementations. Larger values of S produce stronger filtering as they produce non-zero weights for pixel pairs having greater differences. Alternative formulas can be used. For example, formulas can be used that include a characteristic to weight more heavily those pixels having a relatively small difference from the spatially correspondent pixel values in the reference frame 66 occurring at time t. The value of filter strength S is selected empirically depending on specific implementations of the disclosed embodiment. A higher value of S can be helpful when processing a more noisy signal.

When the values of $W_{k,i,j}$ are computed for each pixel, the filtered output value of the $j^{th}$ pixel of the $i^{th}$ macroblock of the constructed frame, is computed as follows:

$$\text{Filter output}_{k,i,j}=\Sigma(W_{k,i,j}*p_{k,i,j})/\Sigma(W_{k,i,j})$$

In this case, the filter output for the pixel $p_{i,j}$ of the constructed reference frame would be the weighted average of spatially corresponding pixel values in each of frames 62-70, with the weight $W_{k,i,j}$ of each pixel in each frame determined as described above. This weighted average can be computed for each spatially corresponding group of pixels in filter set 60. The value of the filter output can be used to set the pixel value in a constructed or alternative reference frame or other predictor, that can be displayed or not displayed to the user. The summation of the foregoing formula is taken over the index k.

In the disclosed embodiment, frames 62-70 can be partitioned into macroblocks 72-80, because coding mode information for macroblocks is available from the first pass encode at this level. Alternatively, other spatial partitions can be used and the partitions can also be defined at the pixel level. Accordingly, the terms "macroblock" and "block" as used in the claims refer to any block of pixels of any arbitrary size including macroblocks. Improved results can be obtained if the degree of correlation between frames can be established for such alternative partitions.

For example, for the $i^{th}$ macroblock the encoder 20 can search frame 62 (time t−2) for a block of pixels (e.g., the motion compensated block 116 shown in FIG. 5) that best matches the spatially correspondent $i^{th}$ macroblock in frame 66 at time t. The center of the motion compensation search area is the same spatial location as the $i^{th}$ macroblock, and in the disclosed embodiment a search radius of three pixels is used. A larger or smaller search radius may be employed depending on the specific implementation.

The preceding technique can include optional features. For example, motion compensation can be used selectively where either the $i^{th}$ macroblock was encoded in a preceding pass with an intra mode, an inter mode with a non zero motion vector or 0,0 inter-frame coding where the correlation is below a predetermined threshold In an alternative embodiment, filter 40 can operate on to the two fields of an interlaced video sequence independently, given the potential for spatial incoherence within each frame in the presence of motion.

In an alternative embodiment, the filter set 60 can be selected from frames that are all either preceding or follow the reference frame. In other words, the filter set can be a set other than one temporally centered about the reference frame.

In an alternative embodiment, the temporal filter 40 can be implemented in a single-pass encoder as well. In that case, a number of input frames can be buffered in the encoder before it produces the first compressed frame. The information collected during the first pass of a two-pass encode process (e.g., encoding modes of macroblocks) can be calculated over the set of buffered frames rather than the entire clip as it is in the two-pass encoder.

The embodiment as disclosed herein for creating temporally filtered reference frames can be used with codecs such as VP8 that support "constructed" reference frames. In an alternative embodiment, the disclosed filter can be used as a temporal noise-reduction pre-filter stage feeding an encoder employing an arbitrary compression method, including for example H.264.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a plurality of frames, comprising:

selecting a filter set from the plurality of frames, each frame of the filter set having a plurality of macroblocks and each macroblock having a plurality of pixels;

selecting a set of filter macroblocks from the filter set, the set of filter macroblocks including a reference macroblock from a reference frame of the filter set and a plurality of filter macroblocks from frames of the filter set other than the reference frame, each of the plurality of filter macroblocks being a macroblock of a respective frame in the filter set that is spatially-correspondent with the reference macroblock;

determining a prediction coding mode associated with each macroblock of the set of filter macroblocks;

determining a macroblock-specific weighting factor for each macroblock of the set of filter macroblocks, the macroblock-specific weighting factor having a value derived from the associated prediction coding mode;

determining weighted averages of pixels in the set of filter macroblocks, wherein a weight applied to each pixel of the pixels in the set of filter macroblocks is derived from the macroblock-specific weighting factor associated with the one of the plurality of filter macroblocks in which the pixel resides;

generating at least a portion of a predictive reference frame using the weighted averages, the predictive reference frame being a frame in addition to the plurality of frames of the video signal;

predicting at least a portion of one of the plurality of frames of the video signal using the at least the portion of the predictive reference frame; and determining, for at least a first pixel in a macroblock of the plurality of filter macroblocks, a pixel-specific factor at least partially indicative of a temporal correlation between a value of the first pixel and a second spatially correspondent pixel in the reference macroblock;

wherein the weight applied to the first pixel in determining a weighted average for the first pixel is derived from the macroblock-specific weighting factor associated with the one of the plurality of filter macroblocks in which the first pixel resides and the pixel-specific factor; and wherein the pixel-specific factor determined for the first pixel is derived using the following formula:

$$P_{kij}=a-f[b*(p_{kij}-p_{rij})^2/n^S],$$

where $P_{kij}$ is the pixel-specific factor, a and b are empirically-derived constants, $p_{kij}$ is a value of the first pixel, $p_{rij}$ is a value of the second pixel, n is an integer, S is a filter strength, and $f[\ ]$ is a function that caps the value of its argument to the value of a.

2. The method of claim 1, wherein determining the macroblock-specific weighting factor further comprises:

setting the macroblock-specific weighting factor to a first value when the prediction coding mode associated with a macroblock of the set of filter macroblocks is inter-frame coding without motion compensation;

setting the macroblock-specific weighting factor to a second value when the prediction coding mode associated with the macroblock of the set of filter macroblocks is inter-frame coding with motion compensation; and setting the macroblock-specific weighting factor to a third value when the prediction coding mode associated with the macroblock of the set of filter macroblocks is intra-frame coding;

wherein the first value is greater than or equal to the second value, and the second value is greater than or equal to the third value.

3. The method of claim 2, wherein setting the macroblock-specific weighting factor to a second value further comprises:

determining a first prediction error score for the macroblock of the set of filter macroblocks using inter-frame coding without motion compensation;

determining a second prediction error score that is the best prediction error score for the macroblock of the set of filter macroblocks using inter-frame coding with motion compensation; and determining a ratio of the first and second prediction error scores;

wherein the second value is derived from a comparison of the ratio to a threshold.

4. The method of claim 1, wherein the filter set is temporally arranged around the reference frame, the reference frame being a central reference frame relative to the frames of the filter set.

5. The method of claim 1, wherein determining the prediction coding mode is performed during a first pass of an encoder, the method further comprising:

determining the weight to be applied to a value of each pixel during a subsequent pass to the first pass.

6. The method of claim 1, wherein the method is performed during a pre-filter stage.

7. The method of claim 1, wherein the pixels in the set of filter macroblocks are divided into at least two fields of an interlaced video sequence and wherein determining the weighted averages of the pixels is performed independently for each field.

8. A method for encoding a video signal having a plurality of frames with spatially correspondent portions, comprising:

determining a plurality of factors for a first portion residing in a selected frame, wherein the factors are at least partially indicative of the correlation between the first portion of the selected frame and at least a second portion residing in another one of the plurality of frames; and applying a temporal filter to at least the first portion and the second portion to generate output that has predictive value, wherein the temporal filter uses filter weights that are derived from the factors; wherein determining the plurality of factors further comprises:

determining a prediction coding mode associated with the first portion, wherein at least one of the plurality of factors is determined using the prediction coding mode; and determining, for at least the first portion, a portion-specific factor derived from the prediction coding mode, wherein determining the portion-specific factor further comprises:

determining a first prediction error score for the first portion relative to the second portion;

determining a second prediction error score that is the best prediction error score for the first portion relative to a block of pixels other than the second portion; and determining the portion-specific factor using the ratio of the first prediction error score to the second error prediction score.

9. The method of claim 8, wherein the first and second portions are spatially correspondent.

10. The method of claim 8, wherein the first portion includes a plurality of pixels, and determining the plurality of factors further comprises:
  determining, for each of a plurality of pixels within the first portion, a pixel-specific factor derived from the temporal correlation that such pixel bears to a spatially correspondent pixel in a frame other than the selected frame;
  wherein the temporal filter uses weights to be applied to values of each of the plurality of pixels, and the weight to be applied to a value for each particular pixel is derived from the pixel-specific factor determined for that pixel and the block-specific factor determined for the first portion.

11. The method of claim 8 wherein determining the portion-specific factor further comprises:
  setting the portion-specific factor within a first range when the prediction coding mode associated with the first portion is inter-frame coding without a motion vector;
  setting the portion-specific factor within a second range when prediction coding mode associated with the first portion is inter-frame coding with a motion vector; and
  setting the portion-specific factor to a factor within a third range when prediction coding mode associated with the first portion is intra-frame coding;
  wherein the first range, second range and third range do not completely overlap with each other.

12. The method of claim 8, further comprising:
  generating at least a portion of a predictive reference frame using the output, the predictive reference frame being a frame in addition to the plurality of frames of the video signal;
  encoding the plurality of frames of the video signal, including predicting at least a portion of one of the plurality of frames of the video signal using the at least the portion of the predictive reference frame;
  including the encoded plurality of frames in an output video bitstream; and
  including the predictive reference frame in the output video bitstream to be used by a decoder to decode the at least the portion of the one of the plurality of frames encoded within the output video bitstream.

13. A method for encoding a video signal having a plurality of frames including a reference frame, each frame including blocks having a plurality of pixels, comprising:
  selecting as a filter set a plurality of blocks including spatially correspondent blocks residing in different ones of the plurality of frames;
  determining the temporal correlation of at least a first block in the filter set relative to at least one other block in the filter set;
  determining a block-specific weighting factor for at least the first block based on its determined temporal correlation, wherein determining the block-specific weighting factor further comprises:
  setting the block-specific weighting factor to a first value when a prediction coding mode associated with the first block is inter-frame coding without motion compensation;
  setting the block-specific weighting factor to a second value when the prediction coding mode associated with the first block is inter-frame coding with motion compensation; and
  setting the block-specific weighting factor to a third value when the prediction coding mode associated with the first block is intra-frame coding; wherein
  the first value is greater than or equal to the second value, and the second value is greater than or equal to the third value; and wherein setting the block-specific weighting factor to a second value further comprises:
  determining a first prediction error score for the first block using inter-frame coding without motion compensation;
  determining a second prediction error score that is the best prediction error score for the first block using inter-frame coding with motion compensation; and
  determining a ratio of the first and second prediction error scores, wherein the second value is derived from a comparison of the ratio to a threshold;
  applying a temporal filter to a plurality of pixels in the filter set, including at least a first pixel in the first block, wherein the temporal filter applies to the first pixel a weight that is derived at least partially from the block-specific weighting factor;
  generating at least a portion of a predictive reference frame using the filtered plurality of pixels wherein the predictive reference frame is a frame in addition to the plurality of frames; and
  including the predictive reference frame in an output video bitstream to be used by a decoder to decode the plurality of frames included as encoded frames in the output video bitstream.

14. The method of claim 13 further comprising:
  determining a block-specific weighting factor for a second block in the filter set; and
  capping the block-specific weighting factor of the first block at the value of the block-specific weighting factor determined for the second block.

15. The method of claim 14, wherein the first block resides in a first frame, the second block resides in a second frame, and first frame is farther from the reference frame than the second frame.

16. The method of claim 13 further comprising:
  adjusting the size of the filter set based upon the determined temporal correlation of at least one of the blocks in the filter set.

17. The method of claim 13 further comprising:
  determining a prediction coding mode associated with at least some of the blocks in the filter set in addition to the first block;
  setting to zero the block-specific factor for each block whose associated prediction coding mode is determined to be intra-frame coding.

18. The method of claim 17 further comprising:
  excluding from the filter set those blocks that reside in frames more remote than a frame in which resides a spatially correspondent block that is associated with an intra-frame coding mode.

19. The method of claim 18, wherein excluding a block from the filter set further comprises setting to zero the block-specific factor for that block.

20. The method of claim 13, further comprising:
  excluding from the filter set those blocks whose temporal correlation is below a threshold.

21. The method of claim 20, further comprising:
  excluding from the filter set those blocks that reside in at least some frames that are more remote than a frame in which resides a spatially correspondent block whose temporal correlation is below a threshold.

22. The method of claim 13, further comprising:
  adjusting the length L of the filter set based at least in part on the determined temporal correlation of at least the first block.

23. The method of claim 22, wherein adjusting the length L of the filter set includes setting to zero the block-specific weighting factor of the first block.

24. The method of claim 23 wherein adjusting the length L of the filter set further comprises setting to zero the block-specific weighting factor of spatially correspondent blocks that are more remote from the reference frame than the first block.

25. The method of claim 13, further comprises:
determining, for at least one pixel in the first block, a pixel-specific weighting factor derived from the temporal correlation that such pixel bears to another spatially correspondent pixel in the filter set; and
wherein applying the temporal filter applies a weight to the value of the at least one pixel that is derived from the pixel-specific weighting factor and the block-specific weighting factor.

* * * * *